(12) United States Patent
Akita et al.

(10) Patent No.: US 9,856,626 B2
(45) Date of Patent: Jan. 2, 2018

(54) HYDRAULIC EXCAVATOR

(71) Applicant: KOMATSU LTD., Tokyo (JP)

(72) Inventors: Yasuyuki Akita, Kaga (JP); Tatsushi Itou, Osaka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/769,833

(22) PCT Filed: May 21, 2015

(86) PCT No.: PCT/JP2015/064641
§ 371 (c)(1),
(2) Date: Aug. 24, 2015

(87) PCT Pub. No.: WO2015/147343
PCT Pub. Date: Oct. 1, 2015

(65) Prior Publication Data
US 2016/0340863 A1 Nov. 24, 2016

(51) Int. Cl.
*E02F 9/08* (2006.01)
*E02F 3/32* (2006.01)
*E02F 9/22* (2006.01)
*F01N 13/18* (2010.01)
*F01N 3/021* (2006.01)
*F01N 3/20* (2006.01)

(52) U.S. Cl.
CPC .............. *E02F 9/0866* (2013.01); *E02F 3/32* (2013.01); *E02F 9/0808* (2013.01); *E02F 9/0816* (2013.01); *E02F 9/22* (2013.01); *F01N 13/1822* (2013.01); *F01N 3/021* (2013.01); *F01N 3/2066* (2013.01); *F01N 2590/08* (2013.01); *F01N 2610/1426* (2013.01); *F01N 2610/1433* (2013.01); *F01N 2610/1453* (2013.01)

(58) Field of Classification Search
CPC .......... F02F 9/0808; F02F 9/0866; F02F 9/08; F02F 9/22; F02F 9/0883
See application file for complete search history.

(56) References Cited

U.S. PATENT DOCUMENTS 8,191,668 B2 * 6/2012 Keane .................... B60K 13/04
180/296
8,403,099 B2 * 3/2013 Yokota ................. B60K 15/063
180/309
(Continued)

FOREIGN PATENT DOCUMENTS

CN 103827405 A 5/2014
CN 103946502 A 7/2014
(Continued)

*Primary Examiner* — Hau V Phan
(74) *Attorney, Agent, or Firm* — Drinker Biddle & Reath LLP

(57) ABSTRACT

The hydraulic excavator capable of accurately positioning an engine and an exhaust gas treatment unit is provided. The hydraulic excavator includes a engine, an exhaust gas treatment unit, a front left pillar portion, a rear left pillar portion, a plurality of support portions, and a center frame. The exhaust gas treatment unit treats an exhaust gas from the engine. The plurality of support portions support the exhaust gas treatment unit. The center frame carries the engine. The center frame has a vertical plate. Two support portions are fixed to the vertical plate.

12 Claims, 13 Drawing Sheets

(56) References Cited

U.S. PATENT DOCUMENTS

| | | | |
|---|---|---|---|
| 8,899,017 B2* | 12/2014 | Himoto | F01N 3/2066 60/282 |
| 8,919,486 B2* | 12/2014 | Nakagami | E02F 9/0866 180/309 |
| 8,955,638 B2* | 2/2015 | Hata | E02F 9/0866 180/296 |
| 9,010,095 B2* | 4/2015 | Himoto | E02F 9/0833 180/296 |
| 9,016,426 B2* | 4/2015 | Himoto | E02F 9/0833 180/296 |
| 9,033,095 B2* | 5/2015 | Sakai | F01N 13/1805 180/309 |
| 9,074,342 B2* | 7/2015 | Kitatani | E02F 9/0808 |
| 2005/0210717 A1* | 9/2005 | Ueda | B62D 33/0625 37/443 |
| 2009/0115223 A1* | 5/2009 | Tsukamoto | B62D 33/0617 296/190.04 |
| 2010/0122865 A1 | 5/2010 | Okada | |
| 2010/0187383 A1* | 7/2010 | Olsen | F01N 13/1805 248/201 |
| 2010/0192551 A1* | 8/2010 | Yokota | B60K 15/063 60/295 |
| 2010/0290883 A1* | 11/2010 | Kitatani | E02F 9/18 414/719 |
| 2012/0067660 A1* | 3/2012 | Kashu | B60K 13/04 180/296 |
| 2012/0247861 A1* | 10/2012 | Mizuno | B60K 13/04 180/296 |
| 2013/0319787 A1* | 12/2013 | Kobayashi | E02F 9/0866 180/309 |
| 2013/0343853 A1* | 12/2013 | Sato | E02F 9/0866 414/719 |
| 2014/0196975 A1 | 7/2014 | Hata et al. | |
| 2014/0318882 A1 | 10/2014 | Sawada | |
| 2015/0000256 A1 | 1/2015 | Kobayashi et al. | |
| 2015/0299983 A1* | 10/2015 | Okamoto | E02F 9/0883 180/296 |

FOREIGN PATENT DOCUMENTS

| | | |
|---|---|---|
| CN | 104334802 A | 2/2015 |
| DE | 112009000336 T5 | 5/2011 |
| DE | 112013000112 T5 | 10/2014 |
| EP | 2 863 028 A1 | 4/2015 |
| JP | 2007-120221 A | 5/2007 |
| JP | 2008-223345 A | 9/2008 |
| JP | 2008-240695 A | 10/2008 |
| JP | 2010-121562 A | 6/2010 |
| JP | 2014-080907 A | 5/2014 |
| JP | 5501534 B1 | 5/2014 |
| JP | 2014-129687 A | 7/2014 |
| JP | 2014-202024 A | 10/2014 |
| JP | 2015-140641 A | 8/2015 |
| KR | 10-2014-0091566 A | 7/2014 |
| WO | WO-2014/006978 A1 | 1/2014 |

* cited by examiner

HYDRAULIC EXCAVATOR

TECHNICAL FIELD

The present invention relates to a hydraulic excavator.

BACKGROUND ART

An exhaust gas treatment device is mounted on a hydraulic excavator. As the exhaust gas treatment device, for example, a diesel particulate filter device, a diesel oxidation catalyst device, a selective catalytic reduction device and the like are available. In particular, the selective catalytic reduction device reduces the nitrogen oxides in an exhaust gas, and purifies the exhaust gas.

Japanese Patent No. 5501534 (PTD 1) discloses such a configuration that a vehicular body frame is provided on a revolving frame, and the exhaust gas treatment device is attached to the vehicular body frame.

CITATION LIST

Patent Document

PTD 1: Japanese Patent No. 5501534

SUMMARY OF INVENTION

Technical Problem

An engine of the hydraulic excavator has large weight. Therefore, the engine is mounted on a center frame with high strength of the revolving frame. A pillar member which constitutes the vehicular body frame disclosed in PTD 1 is arranged outside the center frame. Therefore, the accuracy of the positioning of the engine and the exhaust gas treatment device may deteriorate.

An object of the present invention is to provide a hydraulic excavator capable of positioning an engine and an exhaust gas treatment unit with high accuracy.

Solution to Problem

A hydraulic excavator according to the present invention includes a work implement, an engine, an exhaust gas treatment unit, a plurality of pillar portions, at least two support portions, and a center frame. The exhaust gas treatment unit treats an exhaust gas from the engine. The plurality of pillar portions support the exhaust gas treatment unit. The at least two support portions each have an upper surface to which the pillar portion is fixed. The center frame carries the engine. The center frame has a vertical plate. The vertical plate has a hole formed for a pin serving as a pivot axis of the work implement. The at least two support portions are fixed to the vertical plate.

According to the hydraulic excavator in the present invention, the at least two support portions are fixed to the vertical plate of the center frame. The at least two support portions each have the upper surface and the pillar portion supporting the exhaust gas treatment unit is fixed to the upper surface of the support portion. Therefore, the engine mounted on the center frame and the exhaust gas treatment unit supported by the vertical plate with the support portion and the pillar portion being interposed can accurately be positioned.

In the hydraulic excavator above, the at least two support portions are fixed to the side surface of the vertical plate. The at least two support portions may be fixed to the side surface of the vertical plate with a coupling portion being interposed. By fixing the support portion to the side surface of the vertical plate, the engine and the exhaust gas treatment unit can accurately be positioned.

In the hydraulic excavator above, the pillar portion has a fixing plate portion at a lower end. By fixing the fixing plate portion to the upper surface of the support portion, the pillar portion is two-dimensionally fixed to the upper surface of the support portion. Therefore, the pillar portion can more securely be fixed to the upper surface of the support portion.

In the hydraulic excavator above, the pillar portion is formed to have a cross-section in a U shape. By fixing the pillar portion having the cross-section in the U shape to the upper surface of the support portion, the pillar portion is two-dimensionally fixed to the upper surface of the support portion. Therefore, the pillar portion can more securely be fixed to the upper surface of the support portion.

The hydraulic excavator above includes a deck frame located lateral to the center frame. At least one pillar portion of the plurality of pillar portions is fixed to the deck frame. By fixing the at least two of the plurality of pillar portions to the vertical plate of the center frame and fixing the at least one of the plurality of pillar portions to the deck frame, the exhaust gas treatment unit can be supported in a more stable manner.

In the hydraulic excavator above, the center frame has a plurality of engine mount portions on which the engine is mounted. A mount member is fixed to the center frame. One resulting from partition of an upper surface of the mount member forms one of the plurality of engine mount portions. The other resulting from partition of the upper surface of the mount member forms one of the at least two support portions. Since the support portion and the engine mount portion share the upper surface of one member, the engine mounted on the engine mount portion and the exhaust gas treatment unit supported by the support portion can accurately be positioned.

In the hydraulic excavator above, the at least two support portions are arranged at a distance from each other in a fore/aft direction of a vehicle. Since positioning of the exhaust gas treatment unit with the center frame is performed at two portions distant in the fore/aft direction of the vehicle, the engine and the exhaust gas treatment unit mounted on the center frame can accurately be positioned.

In the hydraulic excavator above, the center frame has a second vertical plate. The second vertical plate is arranged at a distance from the vertical plate in a lateral direction of the vehicle. The at least two support portions are arranged outside a portion between the vertical plate and the second vertical plate. By arranging the support portion at a position outside the portion between a pair of vertical plates, interference by the support portion with arrangement of the engine can be avoided.

In the hydraulic excavator above, the vertical plate has a first surface opposed to the second vertical plate and a second surface opposite to the first surface. The at least two support portions are fixed to the second surface. Thus, arrangement of the support portion outside the portion between the pair of vertical plates can readily be realized.

In the hydraulic excavator above, the at least two support portions are located at an equal height position in a height direction. Thus, the support portion can readily be worked.

In the hydraulic excavator above, the exhaust gas treatment unit has a support member. A longitudinal direction of the support member corresponds to a lateral direction of a vehicle. Thus, the exhaust gas treatment unit having a width in the lateral direction of the vehicle can be supported in a stable manner.

In the hydraulic excavator above, one of the at least two support portions supports a central portion of the support member in the lateral direction of the vehicle. Thus, the exhaust gas treatment unit having a width in the lateral direction of the vehicle can be supported in a stable manner.

In the hydraulic excavator above, the exhaust gas treatment unit has two exhaust gas treatment devices juxtaposed in a lateral direction of a vehicle. Thus, both of the two exhaust gas treatment devices juxtaposed in the lateral direction of the vehicle can be supported in a stable manner.

Advantageous Effects of Invention

According to the hydraulic excavator in the present invention, the engine and the exhaust gas treatment unit can accurately be positioned.

DESCRIPTION OF EMBODIMENTS

Hereinafter, an embodiment of the present invention will be described based on the drawings.

First, a configuration of a hydraulic excavator to which the concept of the present invention can be applied will be described.

Figure 1:
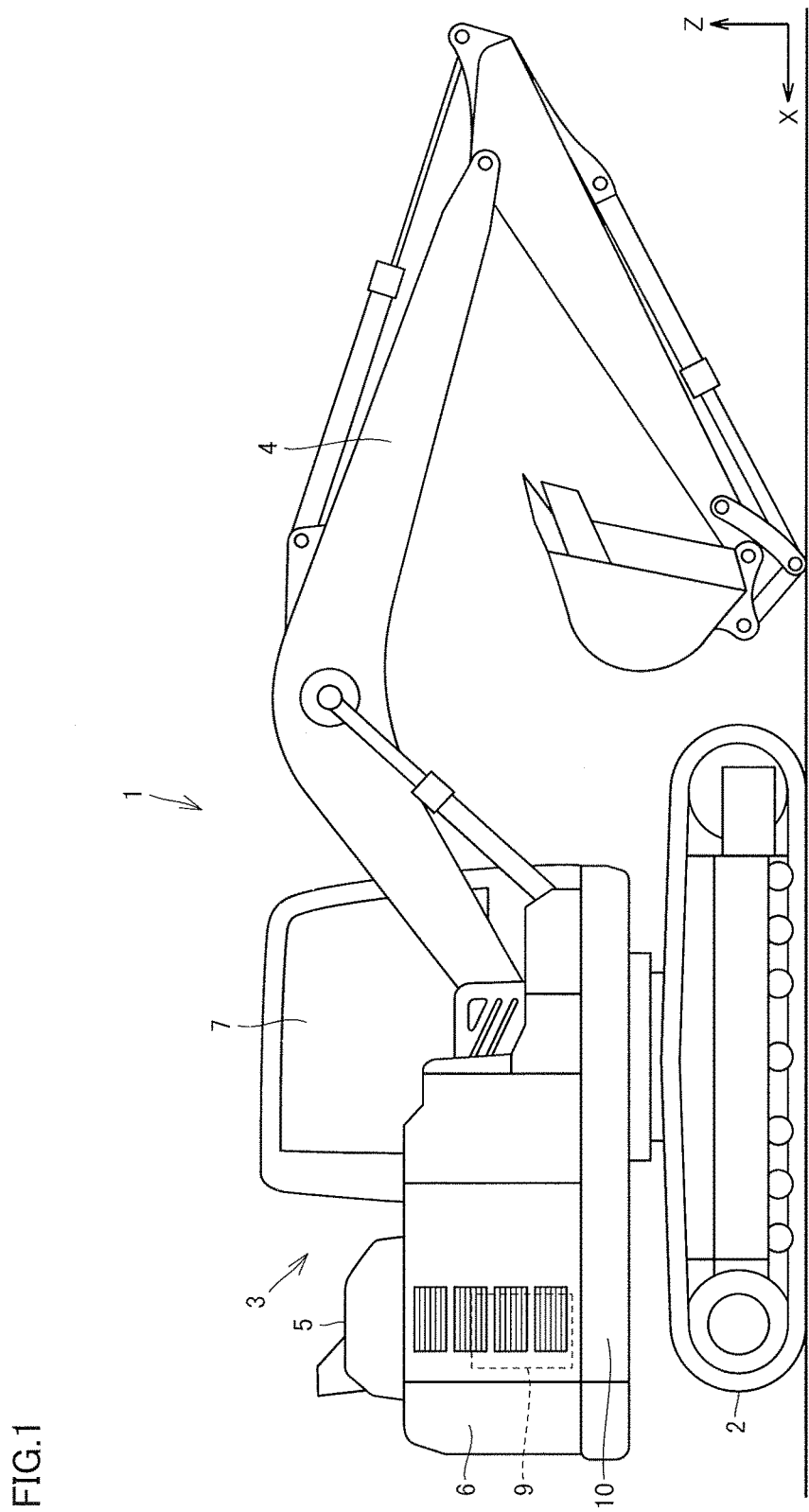
FIG. 1 is a side view showing a configuration of a hydraulic excavator according to one embodiment of the present invention.

FIG. 1 is a side view showing a configuration of a hydraulic excavator 1 according to one embodiment of the present invention. Hydraulic excavator 1 according to the present embodiment mainly includes a traveling unit 2, a revolving unit 3, and a work implement 4, as shown in FIG. 1. The main body of the hydraulic excavator is mainly constituted by traveling unit 2 and revolving unit 3.

Traveling unit 2 is constituted to be self-propelled when a pair of crawler belts rotate. Revolving unit 3 is mounted on traveling unit 2 so that revolving unit 3 can rotate in an arbitrary directions relative to traveling unit 2. Revolving unit 3 includes a cab 7 which is an operator's cab which an operator of hydraulic excavator 1 gets in and out. Revolving unit 3 includes an engine compartment 5 and a counter weight 6 on a rear side.

Revolving unit 3 includes a revolving frame 10. Revolving frame 10 is included in the main body of the hydraulic excavator. Revolving frame 10 is arranged above traveling unit 2. Revolving frame 10 is provided pivotable in an arbitrary directions relative to traveling unit 2. Work implement 4, cab 7, and counter weight 6 are mounted on revolving frame 10, and are arranged on the upper surface of revolving frame 10.

The front side of revolving unit 3 is equipped with work implement 4 which works the earth excavation and the like so as to enable the free operation of work implement 4 to the upward/downward direction. Cab 7 is arranged on the front left side of revolving unit 3. Work implement 4 is provided on right side with respect to cab 7 so that an operator who gets on board cab 7 can view a tip end of work implement 4. Work implement 4 is constituted so that it may be driven by hydraulic cylinders.

Counter weight 6 is a weight arranged at the rear of revolving unit 3, in order to balance the vehicular body during excavation and the like. Engine 9 is accommodated in engine compartment 5 at the rear of revolving unit 3. Engine 9 is mounted on revolving frame 10.

In the present embodiment, a forward side (a front side) of an operator while the operator is seated in cab 7 is defined as the forward side of revolving unit 3, a rear side of the operator is defined as the rear side of revolving unit 3, a left side of the operator in a seated state is defined as the left side of revolving unit 3, and a right side of the operator in the seated state is defined as the right side of revolving unit 3. In the following description, fore and aft, right and left of revolving unit 3 are assumed to be matched with fore and aft, right and left of hydraulic excavator 1, respectively.

The fore/aft direction means the fore/aft direction of hydraulic excavator 1. The fore/aft direction is the fore/aft direction seen from the operator who is seated in cab 7. The lateral direction means the vehicle width direction of hydraulic excavator 1. The lateral direction is the direction of the right and left seen from the operator who is seated in cab 7. In the drawing, X shows the fore/aft direction, Y shows the lateral direction, and Z shows the upward/downward direction.

Figure 2:
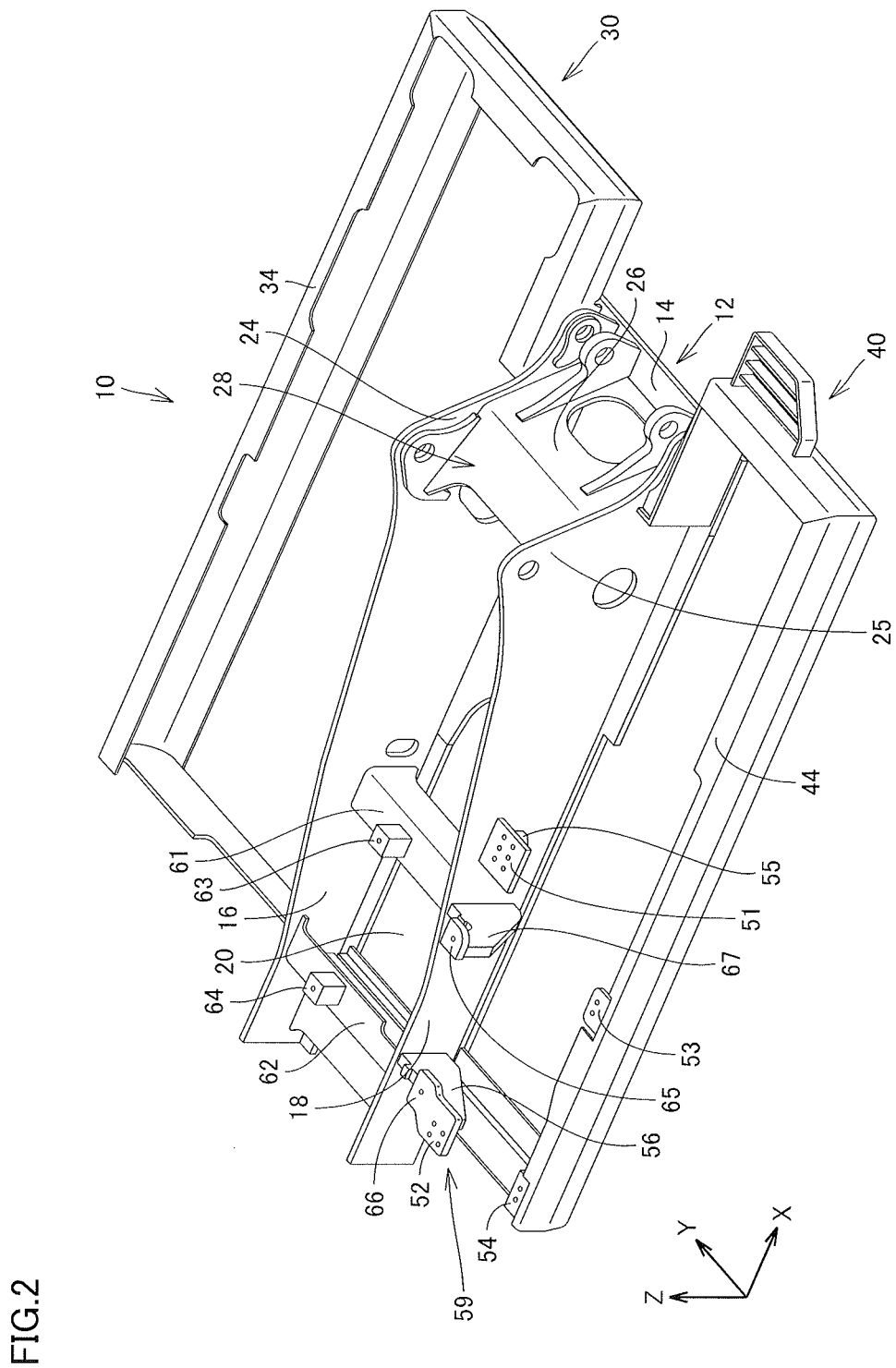
FIG. 2 is a perspective view of a revolving frame included in the hydraulic excavator shown in FIG. 1.
Figure 3:
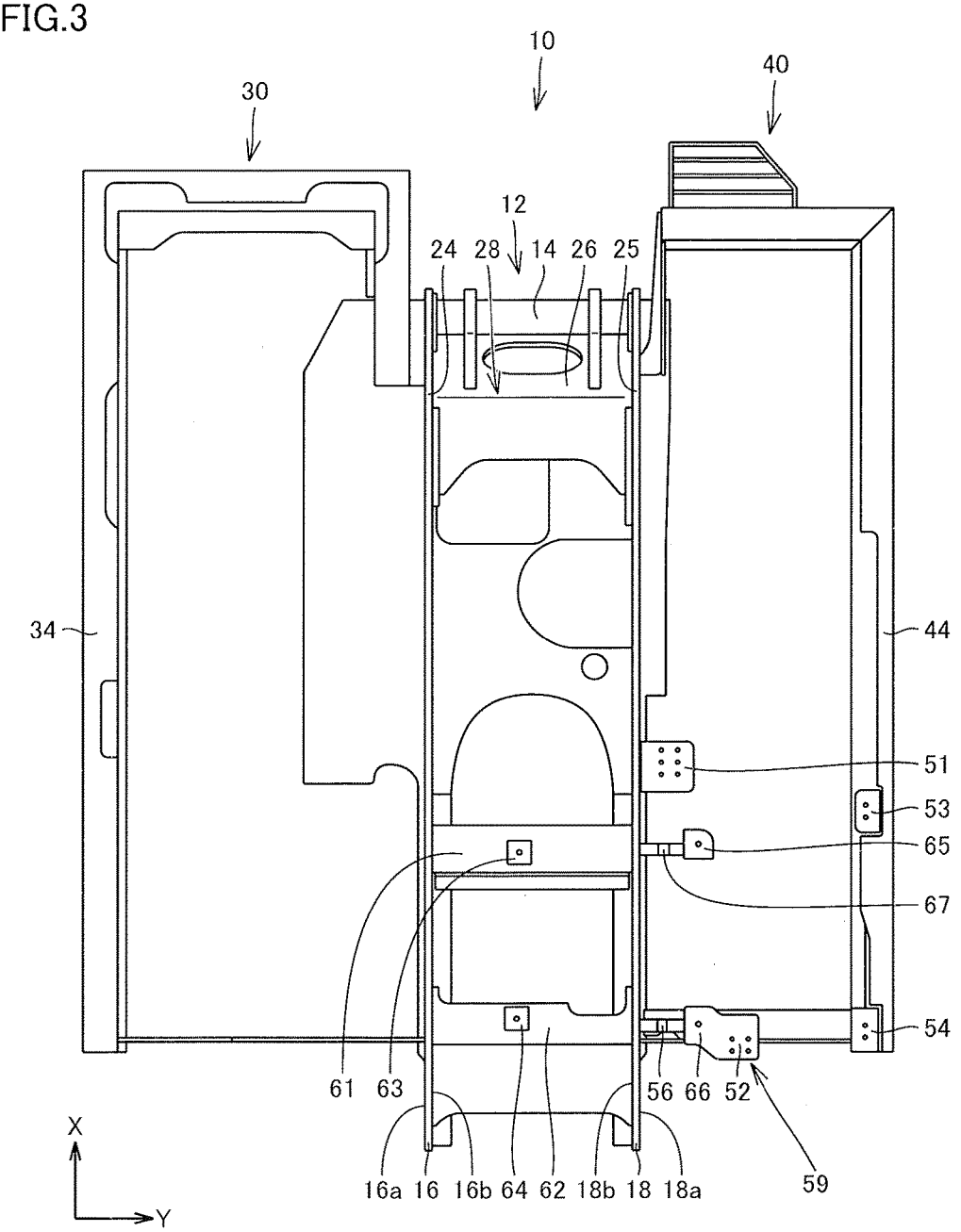
FIG. 3 is a plan view of the revolving frame.

FIG. 2 is a perspective view of revolving frame 10 included in hydraulic excavator 1 shown in FIG. 1. FIG. 3 is a plan view of the revolving frame. As shown in FIG. 2 and FIG. 3, revolving frame 10 has a center frame 12, a left deck frame 30, and a right deck frame 40.

Center frame 12 is located in the center of the lateral direction of revolving frame 10. Center frame 12 has a base plate 14 and a pair of vertical plates 16 and 18. Base plate 14 is a plate-like member extending in the fore/aft direction and extending in the lateral direction. Base plate 14 has an opening 20 which penetrates base plate 14 in the thickness direction.

Vertical plates 16 and 18 are arranged along the fore/aft direction. Left vertical plate 16 is fixed to base plate 14 in the vicinity of the left side edge of base plate 14. Right vertical plate 18 is fixed to base plate 14 in the vicinity of right side edge of base plate 14. Vertical plates 16 and 18 are arranged spaced apart in the width direction of the vehicle.

Each of vertical plates 16 and 18 is constituted by a plate that is set up vertically. Vertical plates 16 and 18 are provided to be orthogonal to base plate 14, and arranged at a distance from each other in the lateral direction of the vehicle.

Plate-like vertical plate 16 has a left surface 16a and a right surface 16b. Plate-like vertical plate 18 has a right surface 18a and a left surface 18b. Left surface 18b of vertical plate 18 faces right surface 16b of vertical plate 16. Right surface 18a of vertical plate 18 is a surface opposite to left surface 18b and does not face vertical plate 16. Vertical plate 18 which is one vertical plate of a pair of vertical plates 16 and 18 has left surface 18b serving as an opposing surface which faces vertical plate 16 which is the other vertical plate of a pair of vertical plates 16 and 18. Vertical plate 18 has right surface 18a which is a non-opposing surface which does not face vertical plate 16.

A support portion 24 of triangular shape in the side view is formed in the front end part of vertical plate 16. A support portion 25 of triangular shape in the side view is formed in the front end part of vertical plate 18. A pair of support portions 24 and 25 are connected with a connection plate 26. A center bracket 28 which supports the base end portion of work implement 4 is constituted by a pair of support portions 24 and 25 and connection plate 26. A hole for a boom foot pin which enables the operation of work implement 4 to the upward/downward direction is formed in a pair of support portions 24 and 25.

Center bracket 28 supports work implement 4 of hydraulic excavator 1 shown in FIG. 1. Work implement 4 is equipped between a pair of vertical plates 16 and 18. Work implement 4 is fixed to center bracket 28 in the state capable of operating in the upward/downward direction. The pair of left and right vertical plates 16 and 18 extend from center bracket 28 rearward. Vertical plates 16 and 18 incline such that the dimension in the upward/downward direction becomes smaller as they are distant from center bracket 28.

Left deck frame 30 is located at left side of center frame 12. Left deck frame 30 is fixed to center frame 12 by welding and is formed in an integral construction with center frame 12. Left deck frame 30 has a side plate 34 extending in the fore/aft direction.

Right deck frame 40 is located at right side of center frame 12. Right deck frame 40 is fixed to center frame 12 by welding and is formed in an integral construction with center frame 12. Right deck frame 40 has a side plate 44 extending in the fore/aft direction.

A first lateral beam 61 and a second lateral beam 62 are provided between a pair of vertical plates 16 and 18. First lateral beam 61 and second lateral beam 62 extend in the lateral direction. A left end of first lateral beam 61 and a left end of second lateral beam 62 are fixed to right surface 16b of vertical plate 16 by welding. A right end of first lateral beam 61 and a right end of second lateral beam 62 are fixed to left surface 18b of vertical plate 18 by welding. First lateral beam 61 and second lateral beam 62 are arranged at a distance from each other in the fore/aft direction of the vehicle. First lateral beam 61 is arranged at front side of second lateral beam 62. Second lateral beam 62 is arranged at rear side of first lateral beam 61.

An engine mount portion 63 is provided on an upper surface of first lateral beam 61. Engine mount portion 63 has rectangle pillar-like shape. Engine mount portion 63 protrudes upward from the upper surface of first lateral beam 61. The upper surface of engine mount portion 63 is formed in parallel with base plate 14. The upper surface of engine mount portion 63 is parallel to the XY plane.

An engine mount portion 64 is provided on an upper surface of second lateral beam 62. Engine mount portion 64 has rectangle pillar-like shape. Engine mount portion 64 protrudes upward from the upper surface of second lateral beam 62. The upper surface of engine mount portion 64 is formed in parallel with base plate 14. The upper surface of engine mount portion 64 is parallel to the XY plane.

In the position on the right of vertical plate 18, an engine mount portion 65 and an engine mount portion 66 are arranged. A coupling portion 67 is fixed to right surface 18a of vertical plate 18. Engine mount portion 65 is fixed to coupling portion 67. Engine mount portion 65 is fixed to right surface 18a of vertical plate 18 with coupling portion 67 being interposed. A coupling portion 56 is fixed to right surface 18a of vertical plate 18. Engine mount portion 66 is fixed to coupling portion 56. Engine mount portion 66 is fixed to right surface 18a of vertical plate 18 with coupling portion 56 being interposed.

Each of upper surface of engine mount portions 65 and 66 is formed in parallel with base plate 14 of center frame 12. The upper surfaces of engine mount portions 65 and 66 are parallel to the XY plane.

In the position on the right of vertical plate 18, a support portion 51 and a support portion 52 are arranged. A coupling portion 55 is fixed to right surface 18a of vertical plate 18. Support portion 51 is fixed to coupling portion 55. Support portion 51 is fixed to right surface 18a of vertical plate 18 with coupling portion 55 being interposed. Support portion 52 is fixed to coupling portion 56. Support portion 52 is fixed to right surface 18a of vertical plate 18 with coupling portion 56 being interposed. Support portions 51 and 52 are fixed to vertical plate 18 which constitutes center frame 12. Support portions 51 and 52 are arranged outside a region between a pair of vertical plates 16 and 18 on the right.

Support portion 51 and support portion 52 are arranged at a distance from each other in the fore/aft direction of the vehicle. Support portion 51 is arranged at front side of support portion 52. Support portion 52 is arranged at rear side of support portion 51.

Each of upper surface of support portions 51 and 52 is formed in parallel with base plate 14 of center frame 12. The upper surfaces of support portions 51 and 52 are parallel to the XY plane.

Support portion 52 and engine mount portion 66 constitute an integral construction. Support portion 52 and engine mount portion 66 are formed by one plate-like member arranged in parallel with base plate 14. A portion of one plate-like member constitutes support portion 52, and the other portion constitutes engine mount portion 66.

The plate-like member which constitutes support portion 52 and engine mount portion 66 as well as coupling portion 56 which supports the plate-like member constitute a mount member 59. Mount member 59 is fixed to center frame 12. Since coupling portion 56 is fixed to right surface 18a of vertical plate 18, mount member 59 is fixed to right surface 18a of vertical plate 18.

An upper surface of mount member 59 are partitioned to form support portion 52 and engine mount portion 66. The upper surface parallel to the XY plane of the plate-like member included in mount member 59 is virtually partitioned in the lateral direction. Left side of the partitioned upper surface of mount member 59 constitutes engine mount portion 66. Right side of the partitioned upper surface of mount member 59 constitutes support portion 52.

A support portion 53 and a support portion 54 are provided on side plate 44 of right deck frame 40. Support portions 53 and 54 are fixed to right deck frame 40. Each of upper surface of support portions 53 and 54 is formed in parallel with base plate 14 of center frame 12. The upper surfaces of support portions 53 and 54 are parallel to the XY plane.

Support portion 53 and support portion 54 are arranged at a distance from each other in the fore/aft direction of the vehicle. Support portion 53 is arranged at the front side of support portion 54. Support portion 54 is arranged at the rear side of support portion 53.

Support portions 51 and 52 and support portions 53 and 54 are arranged at a distance from each other in the lateral direction of the vehicle. Support portions 51 and 52 are fixed to vertical plate 18 of center frame 12. Support portions 53 and 54 are fixed to side plate 44 of right deck frame 40. Therefore, support portions 51 and 52 are arranged on the left of support portions 53 and 54. Support portions 53 and 54 are arranged on the right of support portions 51 and 52. Support portions 53 and 54 are arranged in the vicinity of the right side edge of revolving frame 10.

Figure 4:
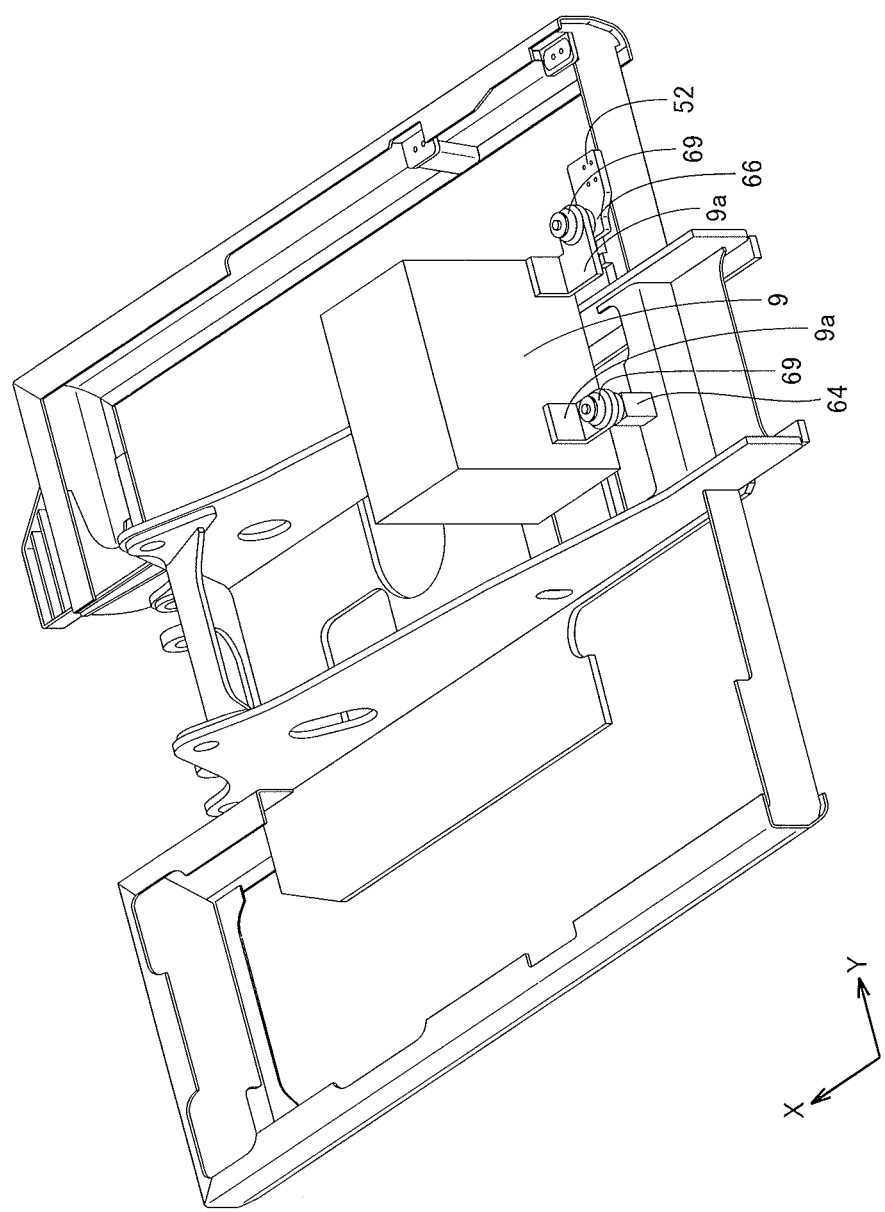
FIG. 4 is a first perspective view showing a state where an engine is mounted on the revolving frame.
Figure 5:
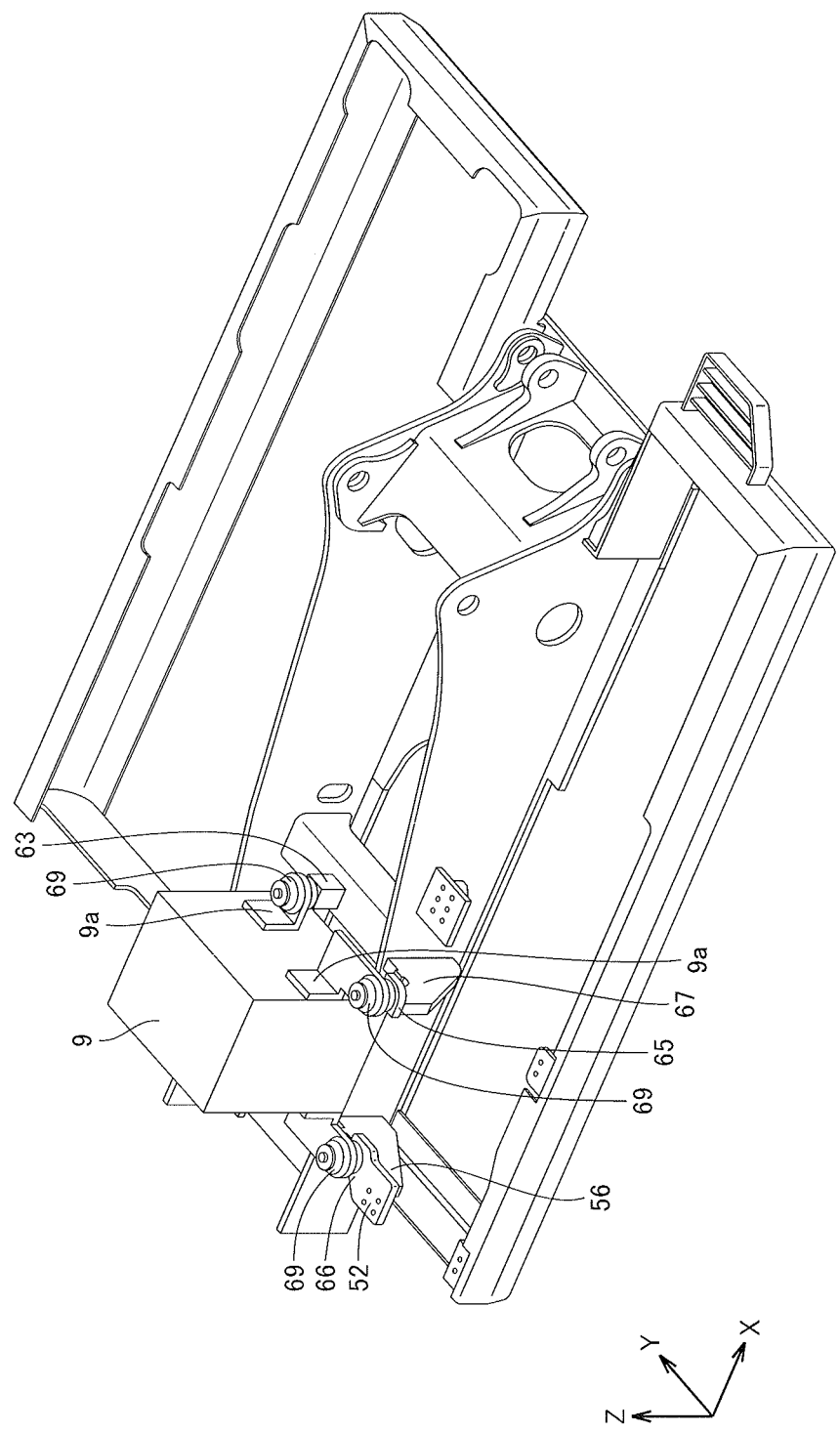
FIG. 5 is a second perspective view showing the state where the engine is mounted on the revolving frame.

FIG. 4 is a first perspective view showing a state where engine 9 is mounted on revolving frame 10. FIG. 5 is a second perspective view showing the state where engine 9 is mounted on revolving frame 10. Hydraulic excavator 1 includes engine 9. Engine 9 is the source of power for driving traveling unit 2 and work implement 4 which are shown in FIG. 1.

Engine 9 is mounted in a rear portion of center frame 12 located in the center in the lateral direction of revolving frames 10. Engine 9 with large weight is arranged, in consideration of weight balance with work implement 4 attached to center bracket 28 described above, at a rear end of revolving frame 10, which is distant from center bracket 28 and close to counter weight 6 (FIG. 1). Engine compartment 5 (FIG. 1) accommodating engine 9 is provided in the rear portion of revolving unit 3.

Engine 9 is mounted on plurality of engine mount portions 63-66 described with reference to FIGS. 2 and 3. All of engine mount portions 63-66 are fixed to center frame 12 of revolving frames 10. Engine 9 is mounted on center frame 12 with engine mount portions 63-66 being interposed.

As shown in FIGS. 4 and 5, plurality of projection portions 9a are provided such that each of them may project from the main portion of engine 9 to the side. Engine 9 has four projection portions 9a of the same number as engine mount portions 63-66. Each of plurality of projection portions 9a is placed on the upper surface of engine mount portions 63-66. Each of engine mount portions 63-66 is provided with fixation member 69. Fixation member 69 penetrates projection portion 9a in the thickness direction, and is fixed to each of engine mount portions 63-66. Engine 9 is fixed to engine mount portions 63-66 by fixation member 69.

Figure 6:
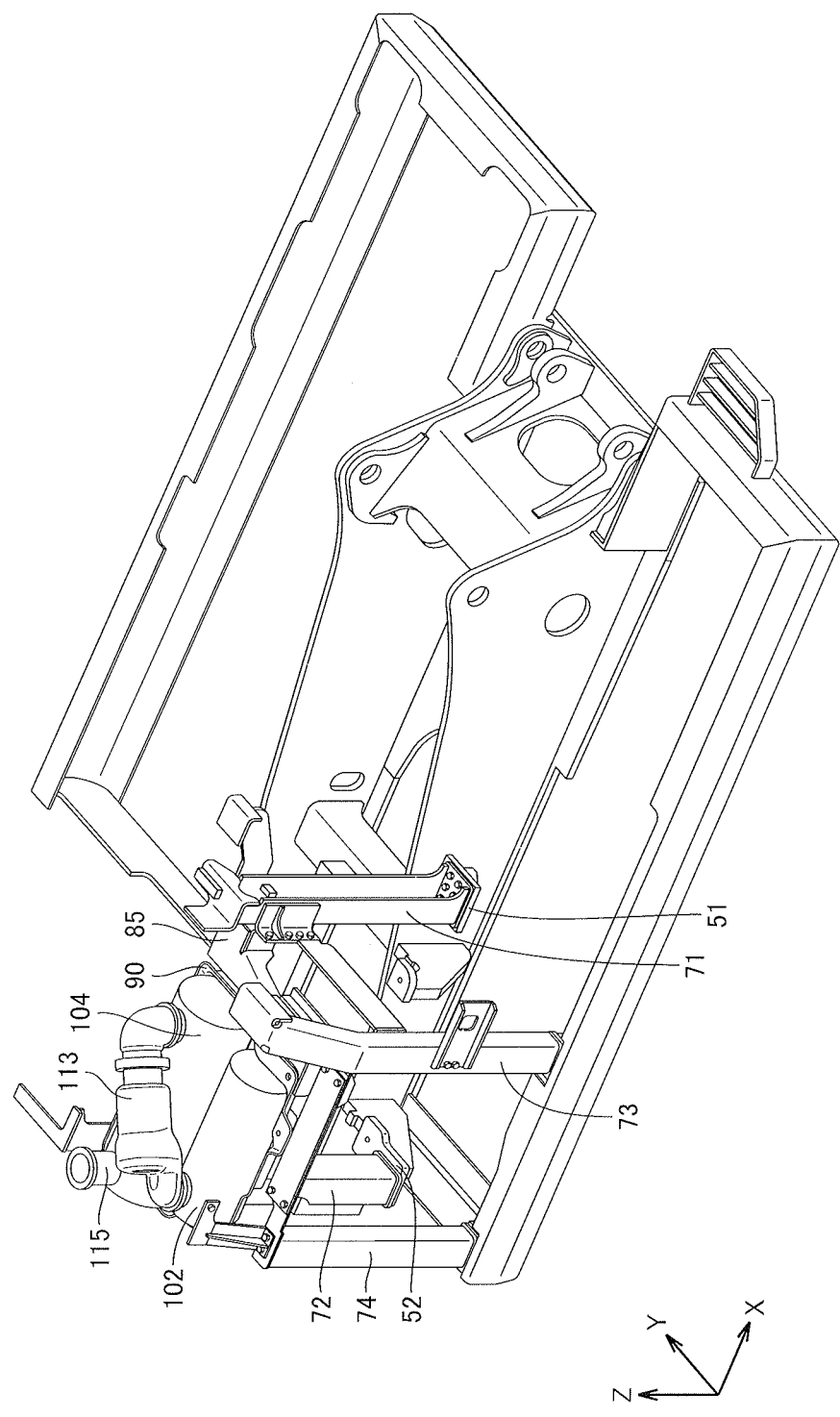
FIG. 6 is a first perspective view showing a state where an exhaust gas treatment unit is mounted on the revolving frame.
Figure 7:
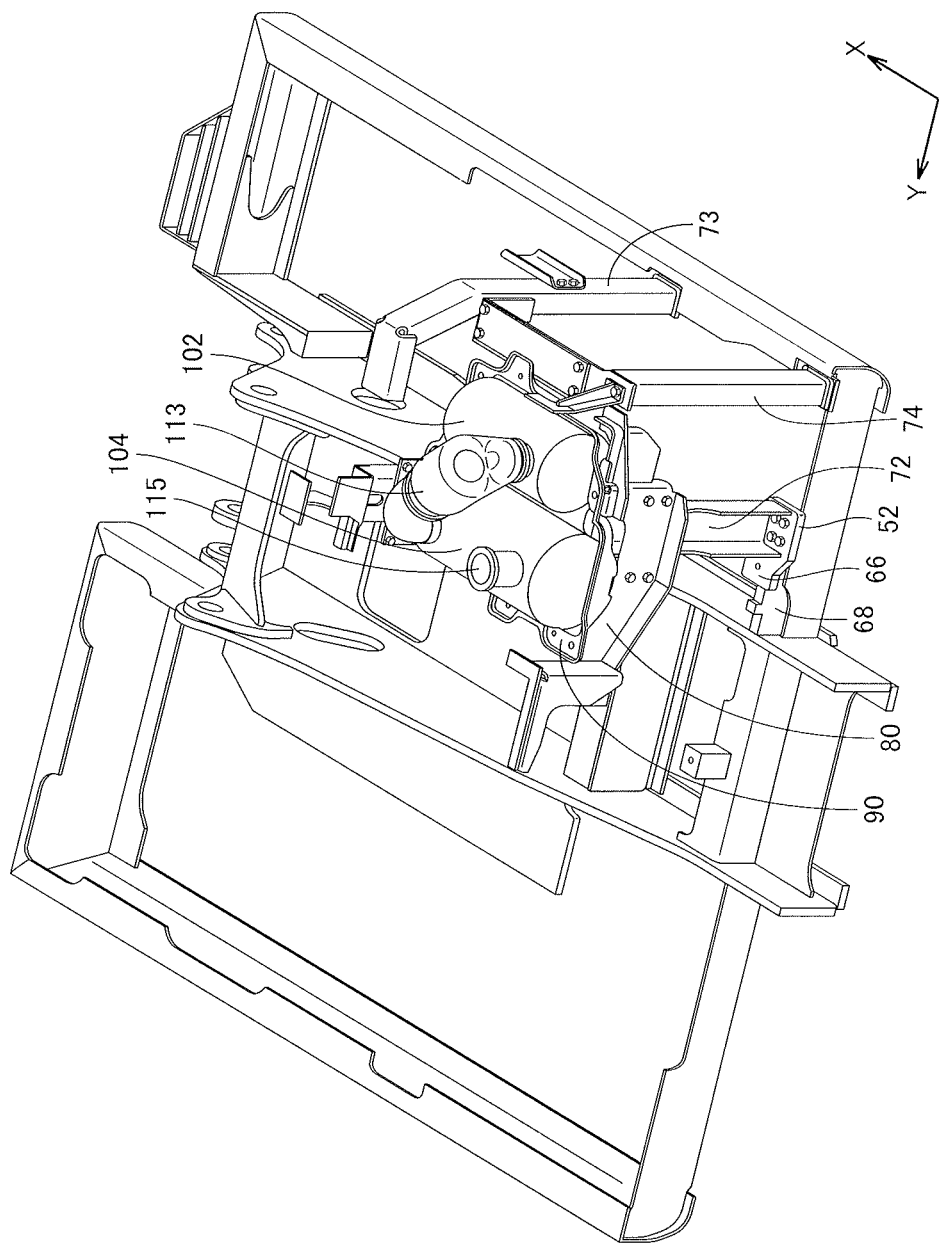
FIG. 7 is a second perspective view showing the state where the exhaust gas treatment unit is mounted on the revolving frame.

FIG. 6 is a first perspective view showing a state where an exhaust gas treatment unit is mounted on revolving frame 10. FIG. 7 is a second perspective view showing the state where the exhaust gas treatment unit is mounted on revolving frame 10. Hydraulic excavator 1 includes, in engine compartment 5 (FIG. 1), the exhaust gas treatment unit for treating and purifying an exhaust gas emitted from engine 9. Engine 9 is omitted from the illustration in FIGS. 6 and 7.

The exhaust gas treatment unit has two exhaust gas treatment devices 102 and 104, an intermediate connection pipe 113, and an exhaust stack 115. As shown in FIGS. 6 and 7, the exhaust gas treatment unit is arranged on the right side with respect to engine 9. A not-shown hydraulic pump which is driven by engine 9 and transfers a hydraulic oil is directly coupled to engine 9. The hydraulic pump is arranged adjacently on the right of engine 9, and the exhaust gas treatment unit is arranged above the hydraulic pump.

Exhaust gas treatment device 102 is connected to engine 9 by means of an exhaust pipe 111 (FIG. 13) which will be described later. Exhaust gas treatment device 104 is connected to exhaust gas treatment device 102 by means of intermediate connection pipe 113. The exhaust gas emitted from engine 9 passes successively exhaust gas treatment device 102 and 104 and is emitted from exhaust stack 115 into atmospheric air. In the flow of the exhaust gas from engine 9, exhaust gas treatment device 102 is arranged downstream of engine 9, and exhaust gas treatment device 104 is arranged downstream of exhaust gas treatment device 102.

Exhaust gas treatment device 102 is configured to collect particulate matters in the exhaust gas emitted from engine 9, and reduces the concentration of the particulate matters in the exhaust gas. Exhaust gas treatment device 102 is a diesel particulate filter, for example.

By the reaction with the reducing agent, exhaust gas treatment device 104 reduces the nitrogen oxides contained in the exhaust gas and chemically changes the nitrogen oxides to a harmless nitrogen gas, to thereby lower a concentration of the nitrogen oxide in the exhaust gas. Exhaust gas treatment device 104 is an NOx removal device of a selection catalyst reduction type, for example. As a reducing agent, although urea water is used suitably, for example, the reducing agent is not restricted thereto. In the present specification, the reducing agent and a precursor of the reducing agent shall be named generically as a "reducing agent".

Intermediate connection pipe 113 is provided with an injection nozzle 128 (FIG. 13) for injecting the reducing agent into intermediate connection pipe 113. Intermediate connection pipe 113 has a function as a mixing piping for injecting and mixing the reducing agent into the exhaust gas.

Exhaust gas treatment devices 102 and 104 are arranged such that each longitudinal direction extends along the fore/aft direction of revolving frame 10. Two exhaust gas treatment devices 102 and 104 are juxtaposed in the lateral direction of the vehicle. Exhaust gas treatment device 102 is provided upstream of exhaust gas treatment device 104 in the flow of the exhaust gas from engine 9, and arranged on the right of exhaust gas treatment device 104. Exhaust gas treatment device 102 is arranged more distant from engine 9 than exhaust gas treatment device 104. In the lateral direction of the vehicle, toward the right from the left, engine 9, exhaust gas treatment device 104, and exhaust gas treatment device 102 are disposed in order. Exhaust gas treatment device 104 and exhaust gas treatment device 102 are disposed in order from the center toward the right end in the lateral direction of revolving frame 10.

Exhaust gas treatment devices 102 and 104 are supported by a pan-shaped bracket 90. Bracket 90 is supported by a plurality of pillar portions with respect to revolving frame 10. The plurality of pillar portions have a front left pillar portion 71, a rear left pillar portion 72, a front right pillar portion 73, and a rear right pillar portion 74. The pillar portions extend in the upward/downward direction. The pillar portions support exhaust gas treatment devices 102 and 104 at four places with respect to revolving frame 10 with bracket 90 being interposed. Each of the pillar portion functions as a pillar on which the compressive load is loaded in the longitudinal direction thereof. Thereby, exhaust gas treatment devices 102 and 104 with large weight is firmly supported on revolving frame 10.

Front left pillar portion 71 is arranged on the inner side of the vehicular body than front right pillar portion 73. Rear left pillar portion 72 is arranged on the inner side of the vehicular body than rear right pillar portion 74. Front right pillar portion 73 is arranged on the outer side of the vehicular body than front left pillar portion 71. Rear right pillar portion 74 is arranged on the outer side of the vehicular body than rear left pillar portion 72.

Exhaust gas treatment devices 102 and 104 are arranged upwardly at a distance from revolving frame 10. The hydraulic pump described above is arranged below with respect to bracket 90 which supports exhaust gas treatment devices 102 and 104.

Front left pillar portion 71 is fixed to support portion 51. Rear left pillar portion 72 is fixed to support portion 52. Front right pillar portion 73 is fixed to support portion 53. Rear right pillar portion 74 is fixed to support portion 54. The exhaust gas treatment unit is supported by the plurality of support portions 51-54. Front left pillar portion 71 and rear left pillar portion 72 are fixed to center frame 12 with support portions 51 and 52 being interposed, respectively. Front right pillar portion 73 and rear right pillar portion 74 are fixed to right deck frame 40 with support portions 53 and 54 being interposed, respectively.

Figure 8:
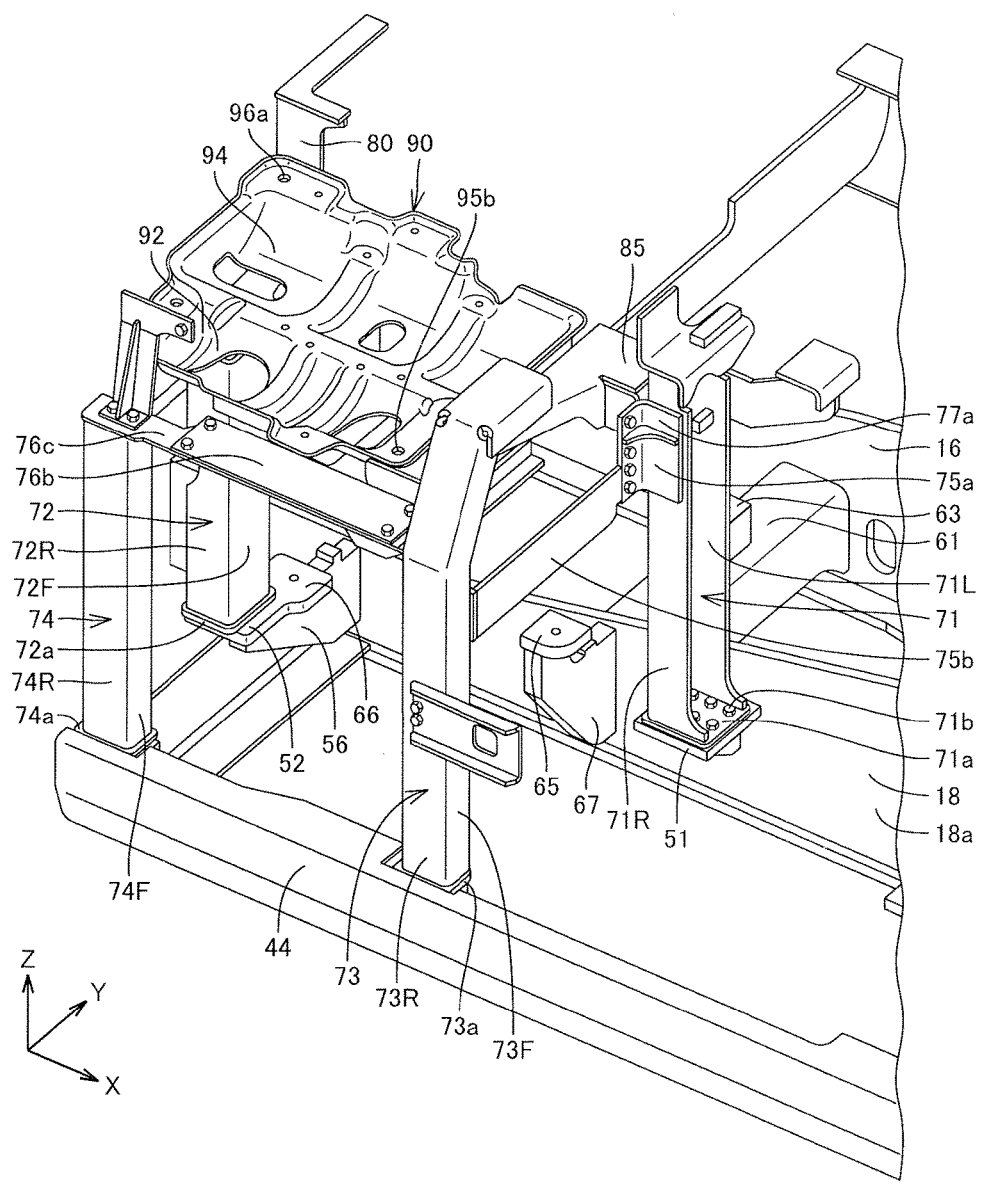
FIG. 8 is a first perspective view showing the configuration for supporting the exhaust gas treatment unit.
Figure 9:
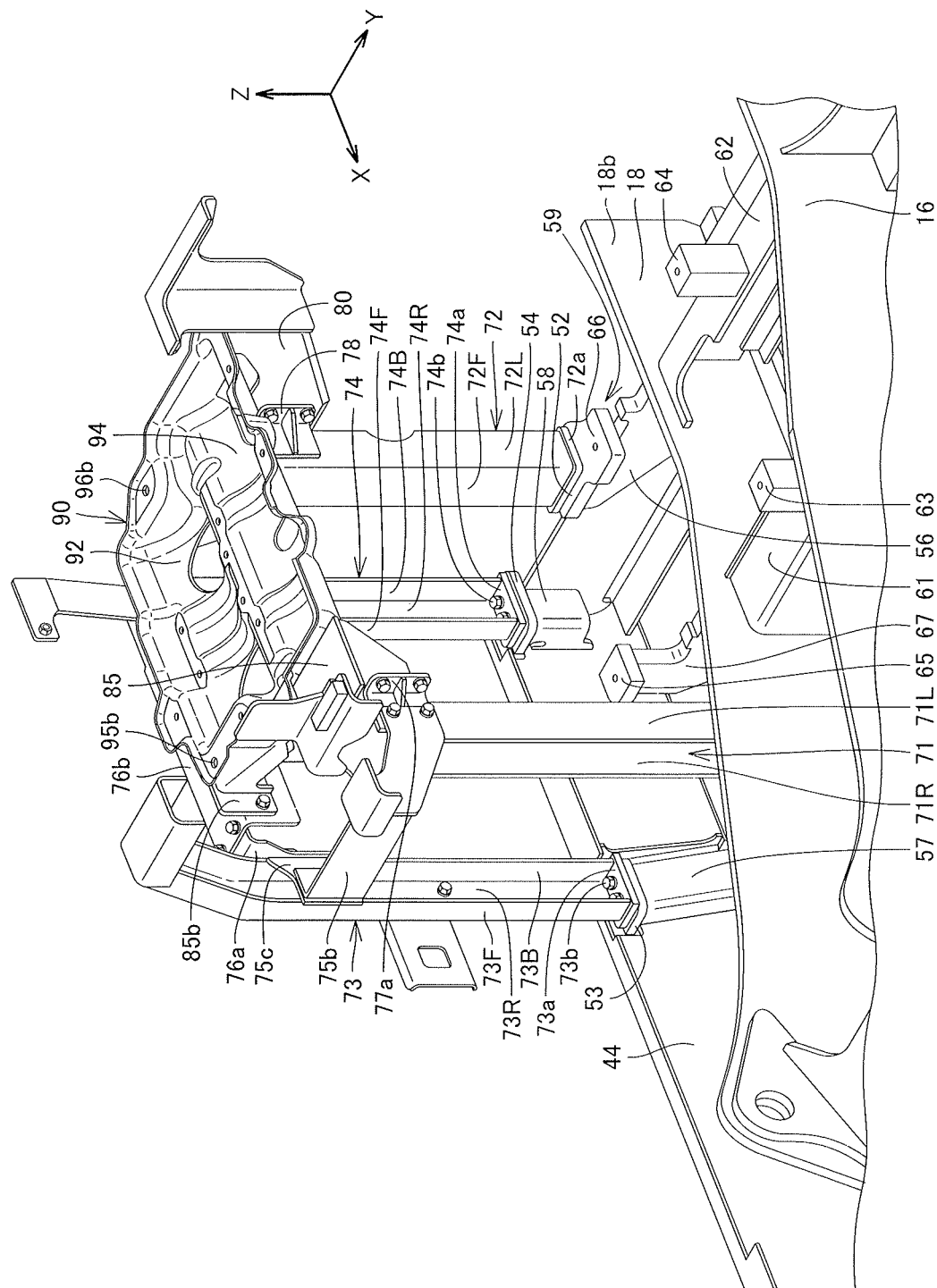
FIG. 9 is a second perspective view showing the configuration for supporting the exhaust gas treatment unit.
Figure 10:
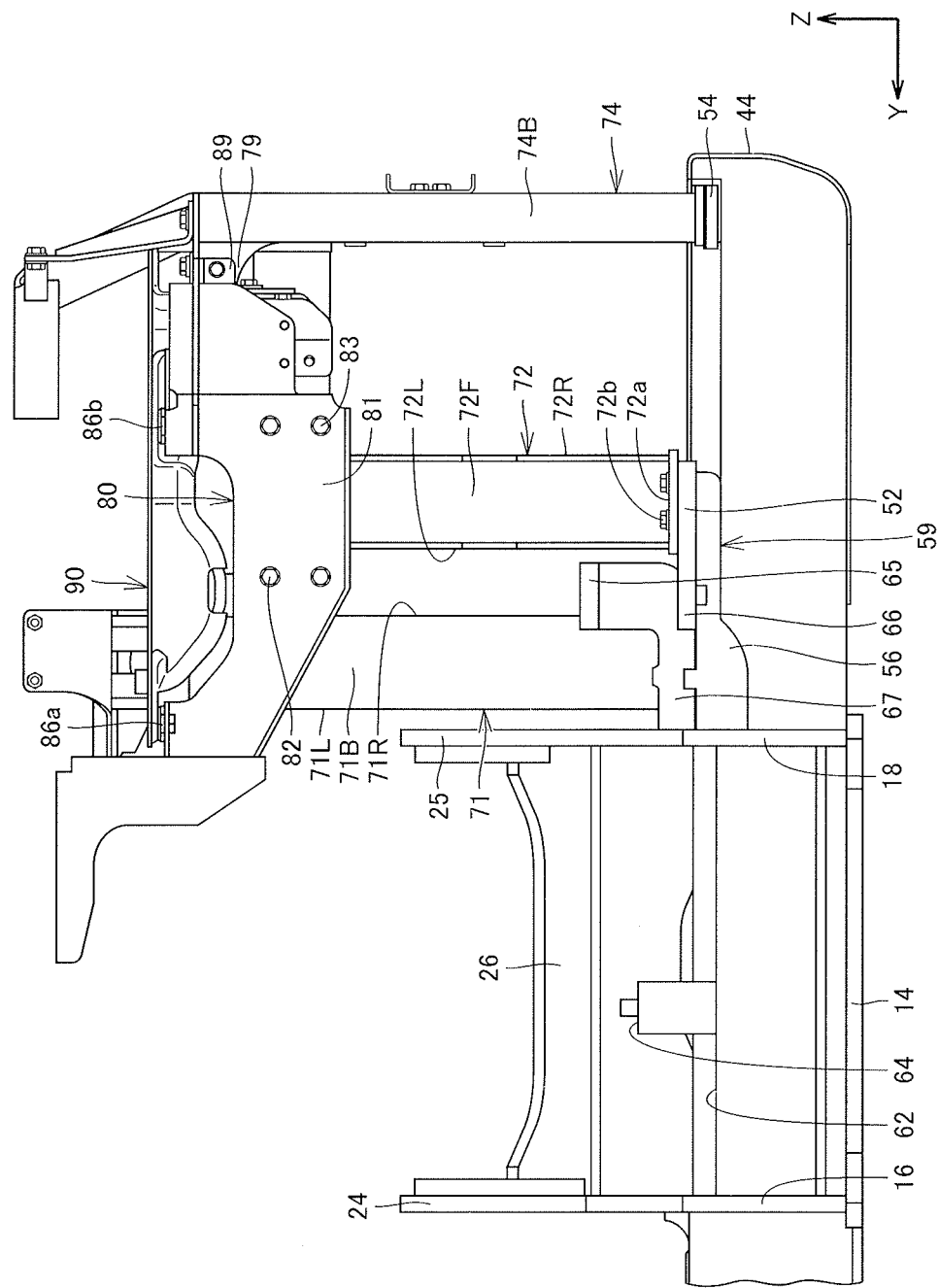
FIG. 10 is a rear view showing the configuration for supporting the exhaust gas treatment unit.

FIG. 8 is a first perspective view showing the configuration for supporting the exhaust gas treatment unit. FIG. 9 is a second perspective view showing the configuration for supporting the exhaust gas treatment unit. FIG. 10 is a rear view showing the configuration for supporting the exhaust gas treatment unit. The perspective view shown in FIG. 8 illustrates bracket 90 and the plurality of pillar portions for supporting exhaust gas treatment devices 102 and 104 seen from the front right side. The perspective view shown in FIG. 9 illustrates bracket 90 and the plurality of pillar portions for supporting exhaust gas treatment devices 102 and 104 seen from the front left side. The view shown in FIG. 10 illustrates bracket 90 and the plurality of pillar portions for supporting exhaust gas treatment devices 102 and 104 seen from the rear side.

Engine 9 and exhaust gas treatment devices 102 and 104 are omitted from the illustration in FIGS. 8-10 and FIGS. 11 and 12 which will be described later. Bracket 90 has accommodation portion 92 accommodating exhaust gas treatment device 102 and accommodation portion 94 accommodating exhaust gas treatment device 104.

Front left pillar portion 71 is formed to have a cross-section in a U shape. The open end of the U shape of front left pillar portion 71 faces frontward. Front left pillar portion 71 has a back face portion 71B, a right side portion 71R, and a left side portion 71L. Back face portion 71B, right side portion 71R, and left side portion 71L have plate-like shape respectively. Right side portion 71R is connected with one of sides of back face portion 71B extending in the upward/downward direction. Left side portion 71L is connected with the other of sides of back face portion 71B extending in the upward/downward direction.

The direction along which back face portion 71B extends and the direction along which right side portion 71R extends intersect with each other, typically are orthogonal to each other. The direction along which back face portion 71B extends and the direction along which left side portion 71L extends intersect with each other, typically are orthogonal to each other. Right side portion 71R and left side portion 71L extend in parallel with each other. Back face portion 71B extends in the upward/downward direction and in the lateral direction. Right side portion 71R and left side portion 71L extend in the upward/downward direction and in the fore/aft direction.

A plate-like fixing plate portion 71a is provided on the lower end of front left pillar portion 71. Fixing plate portion 71a is connected with the lower end of back face portion 71B, right side portion 71R, and left side portion 71L. Plurality of through holes are formed in fixing plate portion 71a. The through holes penetrate fixing plate portion 71a in the thickness direction. A bolt 71b is provided to penetrate each of these through holes. Fixing plate portion 71a is fixed to support portion 51 by means of bolt 71b. Thereby, front left pillar portion 71 is fixed to support portion 51.

Rear left pillar portion 72 is formed to have a cross-section in a U shape. The open end of the U shape of rear left pillar portion 72 faces backward. Rear left pillar portion 72 has a front portion 72F, a right side portion 72R, and a left side portion 72L. Front portion 72F, right side portion 72R, and left side portion 72L have plate-like shape respectively. Right side portion 72R is connected with one of sides of front portion 72F extending in the upward/downward direction. Left side portion 72L is connected with the other of sides of front portion 72F extending in the upward/downward direction.

The direction along which front portion 72F extends and the direction along which right side portion 72R extends intersect with each other, typically are orthogonal to each other. The direction along which front portion 72F extends and the direction along which left side portion 72L extends intersect with each other, typically are orthogonal to each other. Right side portion 72R and left side portion 72L extend in parallel with each other. Front portion 72F extends in the upward/downward direction and in the lateral direction. Right side portion 72R and left side portion 72L extend in the upward/downward direction and in the fore/aft direction.

A plate-like fixing plate portion 72a is provided on the lower end of rear left pillar portion 72. Fixing plate portion 72a is connected with the lower end of front portion 72F, right side portion 72R, and left side portion 72L. Plurality of through holes are formed in fixing plate portion 72a. The through holes penetrate fixing plate portion 72a in the thickness direction. A bolt 72b is provided to penetrate each of these through holes. Fixing plate portion 72a is fixed to support portion 52 by means of bolt 72b. Thereby, rear left pillar portion 72 is fixed to support portion 52.

Front right pillar portion 73 is formed to have a cross-section in a U shape. The open end of the U shape of front right pillar portion 73 faces toward the left. Front right pillar portion 73 has a front portion 73F, a back face portion 73B, and a right side portion 73R. Front portion 73F, back face portion 73B, and right side portion 73R have plate-like shape respectively. Front portion 73F is connected with one of sides of right side portion 73R extending in the upward/downward direction. Back face portion 73B is connected with the other of sides of right side portion 73R extending in the upward/downward direction.

The direction along which right side portion 73R extends and the direction along which front portion 73F extends intersect with each other, typically are orthogonal to each other. The direction along which right side portion 73R extends and the direction along which back face portion 73B extends intersect with each other, typically are orthogonal to each other. Front portion 73F and back face portion 73B extend in parallel with each other. Right side portion 73R extends in the upward/downward direction and in the fore/ aft direction. Front portion 73F and back face portion 73B extend in the upward/downward direction and in the lateral direction.

A plate-like fixing plate portion 73a is provided on the lower end of front right pillar portion 73. Fixing plate portion 73a is connected with the lower end of front portion 73F, back face portion 73B, and right side portion 73R. Plurality of through holes are formed in fixing plate portion 73a. The through holes penetrate fixing plate portion 73a in the thickness direction. A bolt 73b is provided to penetrate each of these through holes. Fixing plate portion 73a is fixed to support portion 53 by means of bolt 73b. Thereby, front right pillar portion 73 is fixed to support portion 53.

A reinforcement portion 57 is fixed to side plate 44. The upper end of reinforcement portion 57 is connected with the lower surface of support portion 53.

Rear right pillar portion 74 is formed to have a cross-section in a U shape. The open end of the U shape of rear right pillar portion 74 faces toward the left. Rear right pillar portion 74 has a front portion 74F, a back face portion 74B, and a right side portion 74R. Front portion 74F, back face portion 74B, and right side portion 74R have plate-like shape respectively. Front portion 74F is connected with one of sides of right side portion 74R extending in the upward/downward direction. Back face portion 74B is connected with the other of sides of right side portion 74R extending in the upward/downward direction.

The direction along which right side portion 74R extends and the direction along which front portion 74F extends intersect with each other, typically are orthogonal to each other. The direction along which right side portion 74R extends and the direction along which back face portion 74B extends intersect with each other, typically are orthogonal to each other. Front portion 74F and back face portion 74B extend in parallel with each other. Right side portion 74R extends in the upward/downward direction and in the fore/aft direction. Front portion 74F and back face portion 74B extend in the upward/downward direction and in the lateral direction.

A plate-like fixing plate portion 74a is provided on the lower end of rear right pillar portion 74. Fixing plate portion 74a is connected with the lower end of front portion 74F, back face portion 74B, and right side portion 74R. Plurality of through holes are formed in fixing plate portion 74a. The through holes penetrate fixing plate portion 74a in the thickness direction. A bolt 74b is provided to penetrate each of these through holes. Fixing plate portion 74a is fixed to support portion 54 by means of bolt 74b. Thereby, rear right pillar portion 74 is fixed to support portion 54.

A reinforcement portion 58 is fixed to side plate 44. The upper end of reinforcement portion 58 is connected with the lower surface of support portion 54.

A support member 80 is connected with the upper end of rear left pillar portion 72. Support member 80 extends in the lateral direction of the vehicle. Support member 80 is provided so that the longitudinal direction thereof corresponds to the lateral direction of the vehicle. Support member 80 has a portion extending toward the right with respect to rear left pillar portion 72 and a portion extending toward the left with respect to rear left pillar portion 72.

Support member 80 has a beam portion 81. Beam portion 81 mounts bracket 90 thereon and supports bracket 90. Beam portion 81 functions as a beam which transmits the load of exhaust gas treatment devices 102 and 104 mounted on bracket 90 to rear left pillar portion 72.

Bracket 90 is provided with attachment portions 96a and 96b at the rear of the vehicle. Beam portion 81 is provided two attachment portions 86a and 86b. Attachment portions 96a and 96b of bracket 90 are attached to two attachment portions 86a and 86b of beam portion 81, respectively, and bracket 90 is attached to beam portion 81.

Bracket 90 is fixed to beam portion 81 at attachment portions 86a and 86b by means of bolts. Attachment portion 86a is provided on the left of rear left pillar portion 72. Attachment portion 86b is provided on the right of rear left pillar portion 72.

Beam portion 81 is fixed to rear left pillar portion 72 by means of bolts 82 and 83. Bolt 82 is provided on the left of rear left pillar portion 72. Bolt 83 is provided on the right of rear left pillar portion 72. Each of connection portions 78 is provided on the right surface of right side portion 72R and the left surface of left side portion 72L of rear left pillar portion 72, respectively. Support member 80 is fixed to rear left pillar portion 72 with connection portion 78 being interposed. In the both sides of the lateral direction of the vehicle with respect to rear left pillar portion 72, bolts 82 and 83 are fastened to connection portion 78, respectively. Thereby, beam portion 81 is fixed to rear left pillar portion 72.

The center portion in the lateral direction of the vehicle of support member 80 is connected with rear left pillar portion 72. The lower end of rear left pillar portion 72 is fixed to support portion 52. The upper end of rear left pillar portion 72 is fixed to support member 80. Support member 80 is fixed to support portion 52 with rear left pillar portion 72 being interposed. Support portion 52 supports the central portion in the lateral direction of the vehicle of support member 80.

A support member 85 is connected with the upper end of front left pillar portion 71. Support member 85 extends in the lateral direction of the vehicle. Support member 85 is provided so that the longitudinal direction thereof corresponds to the lateral direction of the vehicle. Support member 85 extends toward the right with respect to front left pillar portion 71. Connection portions 77a and 77a are provided on the right surface of right side portion 71R and the left surface of left side portion 71L of front left pillar portion 71, respectively. Support member 85 is fixed to front left pillar portion 71 with connection portion 77a being interposed.

Support member 85 mounts bracket 90 thereon and supports bracket 90. Bracket 90 is provided with attachment portions on the front side of the vehicle including attachment portion 95b. Bracket 90 is fixed to support member 85 at the attachment portion.

The left end portion in the lateral direction of the vehicle of support member 85 is connected with front left pillar portion 71. The lower end of front left pillar portion 71 is fixed to support portion 51. The upper end of front left pillar portion 71 is fixed to support member 85. Support member 85 is fixed to support portion 51 with front left pillar portion 71 being interposed. Support portion 51 supports the left end portion in the lateral direction of the vehicle of support member 85.

A connection portion 75a is provided on the right surface of right side portion 71R of front left pillar portion 71. A connection portion 75c is provided across front portion 73F and back face portion 73B of front right pillar portion 73. Connection portion 75a and connection portion 75c are connected by a connection member 75b. Connection member 75b extends in the lateral direction of the vehicle. The left end portion in the lateral direction of the vehicle of connection member 75b is connected with connection portion 75a. The right end portion in the lateral direction of the vehicle of connection member 75b is connected with connection portion 75c. Front left pillar portion 71 and front right pillar portion 73 are connected by connection member 75b.

A connection portion 76a is provided on the rear surface of back face portion 73B of front right pillar portion 73. A connection portion 76c is provided to project frontward from front portion 74F of rear right pillar portion 74. Connection portion 76a and connection portion 76c are connected by a connection member 76b. Connection member 76b extends in the fore/aft direction of the vehicle. The front end part in the fore/aft direction of the vehicle of connection member 76b is connected with connection portion 76a. The rear end part in the fore/aft direction of the vehicle of connection member 76b is connected with connection portion 76c. Front right pillar portion 73 and rear right pillar portion 74 are connected by connection member 76b.

Connection member 76b has an L shape seen in the fore/aft direction of the vehicle. Connection member 76b has a portion which extends in the fore/aft direction of the vehicle and extends in parallel with base plate 14 and a portion which extends in the fore/aft direction of the vehicle and extends in the upward/downward direction. Support member 85 is connected with the portion of connection member 76b extending in the upward/downward direction. Support member 85 has a connection portion 85b in the right end portion in the lateral direction of the vehicle. Connection portion 85b is fixed to connection member 76b. Support member 85 is connected with both front left pillar portion 71 and front right pillar portion 73.

A connection portion 79 is provided to project toward the left from rear right pillar portion 74. A connection portion 89 is provided in the right end portion in the lateral direction of the vehicle of support member 80. Connection portion 89 is connected with connection portion 79. The right end portion of support member 80 is supported by rear right pillar portion 74. Support member 80 is connected with both rear left pillar portion 72 and rear right pillar portion 74.

Figure 11:
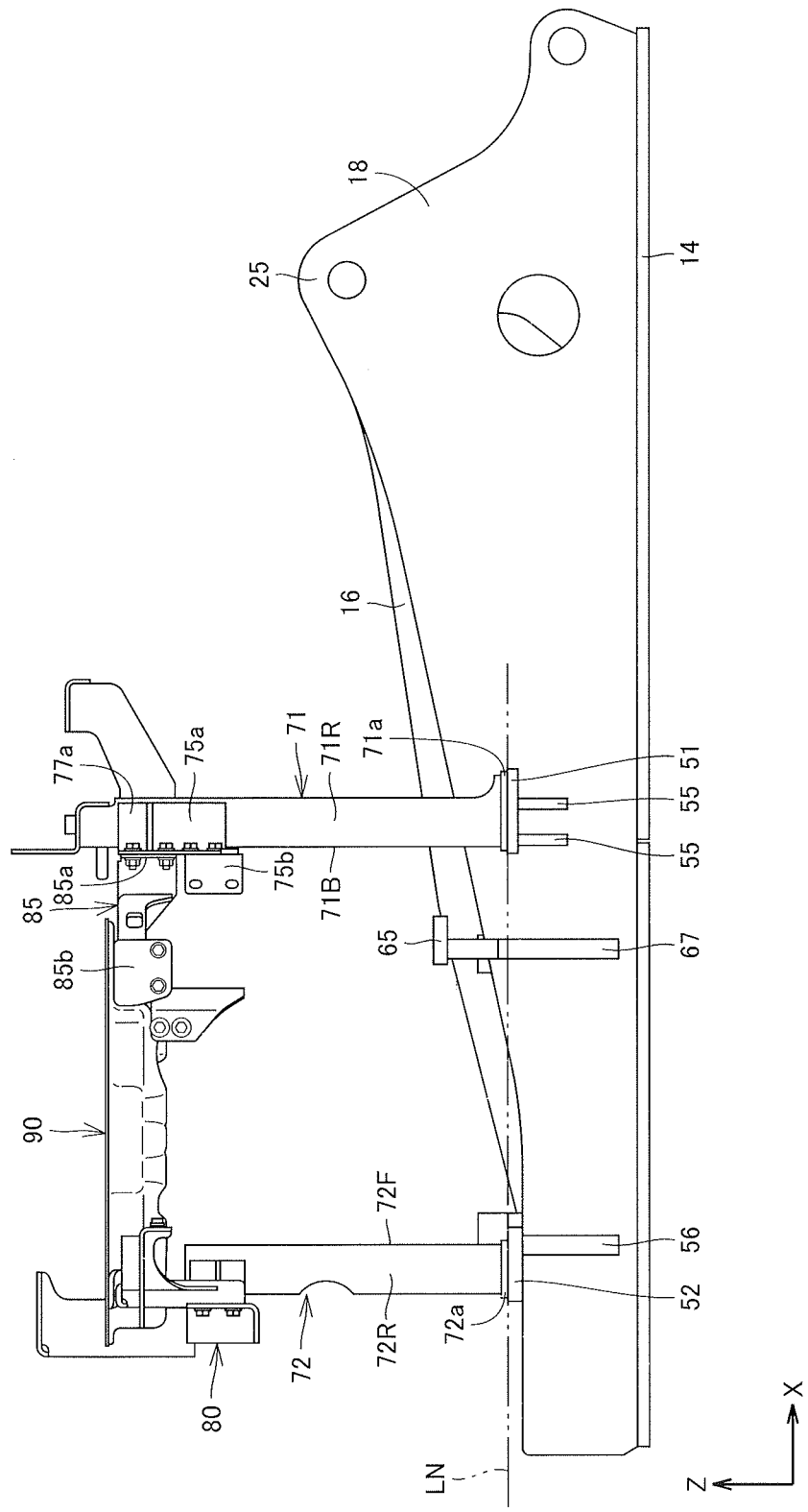
FIG. 11 is a side view showing the configuration for supporting the exhaust gas treatment unit.
Figure 12:
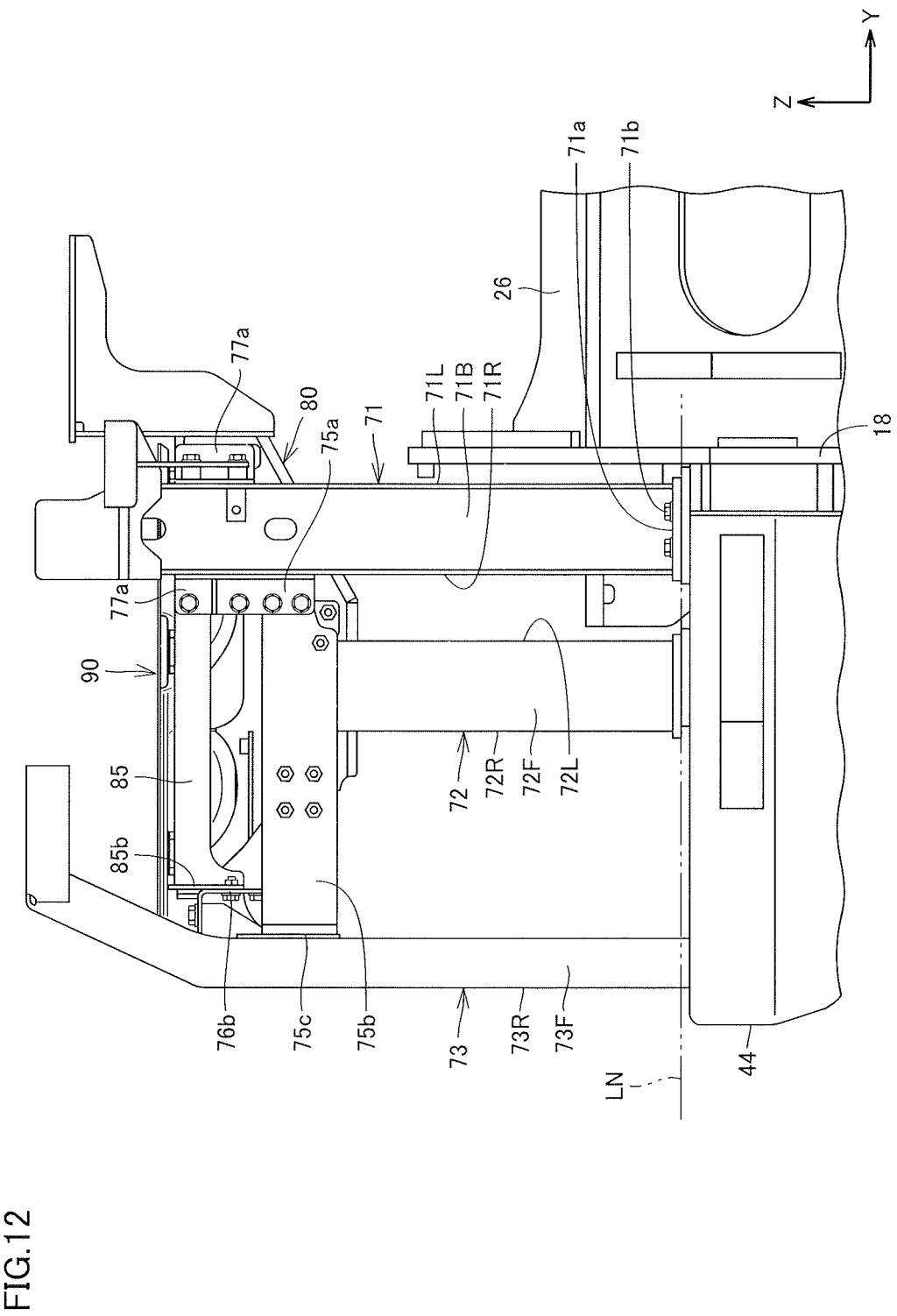
FIG. 12 is a front view showing the configuration for supporting the exhaust gas treatment unit.

FIG. 11 is a side view showing the configuration for supporting the exhaust gas treatment unit. FIG. 12 is a front view showing the configuration for supporting the exhaust gas treatment unit. The view shown in FIG. 12 illustrates bracket 90 and the plurality of pillar portions for supporting exhaust gas treatment devices 102 and 104 seen from the front. The view shown in FIG. 11 illustrates bracket 90 and front left pillar portion 71 and rear left pillar portion 72 of the plurality of pillar portions for supporting exhaust gas treatment devices 102 and 104 seen from the right side. In FIG. 11, center frame 12 is illustrated, and right deck frame 40 is omitted from the illustration in order to facilitate understanding.

Support member 85 has a connection portion 85a in the left end portion in the lateral direction of the vehicle. Connection portion 85a is fixed to connection portion 77a provided in front left pillar portion 71.

Line LN shown with the chain double-dashed line in FIGS. 11 and 12 shows a line extending in parallel with base plate 14 of center frame 12. As shown in FIGS. 10 and 11, the upper surfaces of support portions 51 and 52 extend in parallel with base plate 14 and are on the same plane. The upper surfaces of support portions 51 and 52 are in the same height position in the height direction.

Figure 13:
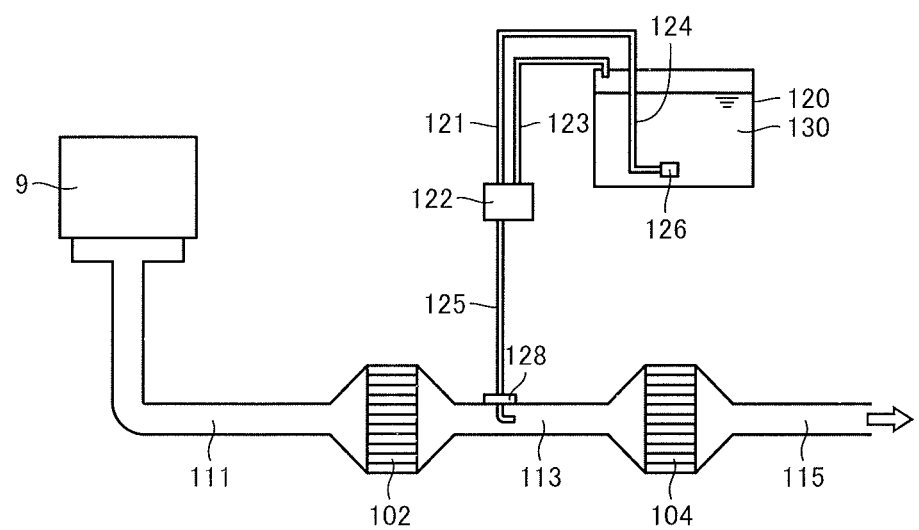
FIG. 13 is a functional diagram schematically showing a path for a reducing agent and a path for the exhaust gas from the engine.

FIG. 13 is a functional diagram schematically showing a path for the reducing agent and a path for the exhaust gas from engine 9. As shown in FIG. 13, the exhaust gas emitted from engine 9 is exhausted from exhaust stack 115 to the outside of the vehicle via exhaust pipe 111, exhaust gas treatment device 102, intermediate connection pipe 113, and exhaust gas treatment device 104 in order. Injection nozzle 128 is provided in intermediate connection pipe 113 upstream of exhaust gas treatment device 104 in the flow of the exhaust gas.

A reducing agent 130 is stored in a reducing agent tank 120. A suction pipe 124 in which reducing agent 130 which flows out of reducing agent tank 120 flows is arranged inside of reducing agent tank 120. A strainer (a filter) 126 is connected to a tip end of suction pipe 124. Suction pipe 124 is coupled to a supply pipe 121. Reducing agent 130 suctioned from reducing agent tank 120 is transferred by a reducing agent pump 122 and reaches injection nozzle 128 via supply pipe 121 and a delivery pipe 125 in order. Reducing agent 130 not used for exhaust gas treatment is returned to reducing agent tank 120 from reducing agent pump 122 via a return pipe 123.

Injection nozzle 128 has a function as a reducing agent injector for injecting reducing agent 130 suctioned from reducing agent tank 120 to the upstream of the exhaust gas relative to exhaust gas treatment device 104. Reducing agent 130 is supplied by injection nozzle 128 into the exhaust gas which flows through the inside of intermediate connection pipe 113. In exhaust gas treatment device 104, the nitrogen oxide contained in the exhaust gas reacts with reducing agent 130, then a concentration of the nitrogen oxide in the exhaust gas decreases in a case that urea water is employed as reducing agent 130, the urea water is decomposed in intermediate connection pipe 13 and converted to ammonia, and nitrogen oxide is decomposed to harmless nitrogen and oxygen as a result of reaction of nitrogen oxide and ammonia. The exhaust gas of which amount of the nitrogen oxide has lowered to an appropriate value is emitted from exhaust stack 115.

A function and effect of the present embodiment will now be described.

Hydraulic excavator 1 according to the present embodiment includes work implement 4, as shown in FIG. 1. Hydraulic excavator 1 includes engine 9 and the exhaust gas treatment unit which treats the exhaust gas from engine 9, as shown in FIG. 13. Hydraulic excavator 1 includes front left pillar portion 71 and rear left pillar portion 72, as shown in FIGS. 6, 8, and 9. Hydraulic excavator 1 includes center frame 12 and support portions 51 and 52, as shown in FIGS. 2 and 3. Front left pillar portion 71 and rear left pillar portion 72 support the exhaust gas treatment unit, as shown in FIGS. 6 and 7. Support portion 51 has the upper surface to which front left pillar portion 71 is fixed, as shown in FIGS. 2 and 3 and FIGS. 6 and 8. Support portion 52 has the upper surface to which rear left pillar portion 72 is fixed, as shown in FIGS. 2 and 3 and FIGS. 6 and 8. Center frame 12 carries engine 9, as shown in FIGS. 4 and 5. Center frame 12 has vertical plate 18, as shown in FIG. 2. Vertical plate 18 has the hole for the boom foot pin serving as the pivot axis of work implement 4. Support portion 51 and support portion 52 are fixed to vertical plate 18 of center frame 12 as shown in FIGS. 2 and 3.

Right deck frame 40 is assembled independent of center frame 12, and is thereafter welded and fixed to center frame 12. In the conventional configuration in which the plurality of support portions which support the exhaust gas treatment unit are attached to right deck frame 40, if the position of right deck frame 40 relative to center frame 12 shifts when right deck frame 40 is fixed to center frame 12, engine 9 mounted on center frame 12 and the exhaust gas treatment unit supported by the support portion will be misaligned. As a result, the positioning of engine 9 and the exhaust gas treatment unit becomes difficult.

Engine mount portions 65 and 66 on which engine 9 is mounted are attached to vertical plate 18, and the strength of vertical plate 18 is large. Like the present embodiment, by fixing at least two support portions to vertical plate 18 of center frame 12 and fixing the pillar portion which supports the exhaust gas treatment unit to the upper surface of the support portion, the arrangement of the support portion relative to center frame 12 is defined with sufficient accuracy. Thereby, engine 9 mounted on center frame 12 and the exhaust gas treatment unit supported by vertical plate 18 with the support portion and the pillar portion being interposed can be accurately positioned at the time of the assembly. Therefore, it becomes possible to readily attach exhaust pipe 111 which connects engine 9 and exhaust gas treatment device 102. In addition, since support portions 51 and 52 can be formed by machining relative to vertical plate 18 by fixing support portions 51 and 52 to vertical plate 18, support portions 51 and 52 can readily be formed in the accurate position.

As shown in FIGS. 2 and 3, support portions 51 and 52 are fixed to the side surface of vertical plate 18. Support portion 51 is fixed to the side surface of vertical plate 18 with coupling portion 55 being interposed. Support portion 52 is fixed to the side surface of vertical plate 18 with coupling portion 56 being interposed. By fixing support portions 51 and 52 to the side surface of vertical plate 18, engine 9 and the exhaust gas treatment unit can be accurately positioned.

As shown in FIGS. 8 and 12, front left pillar portion 71 has fixing plate portion 71a at the lower end. As shown in FIG. 10, rear left pillar portion 72 has fixing plate portion 72a at the lower end. As shown in FIGS. 11 and 12, by fixing fixing plate portion 71a to the upper surface of support portion 51, front left pillar portion 71 is two-dimensionally fixed to the upper surface of support portion 51. As shown in FIGS. 10 and 11, by fixing fixing plate portion 72a to the upper surface of support portion 52, rear left pillar portion 72 is two-dimensionally fixed to the upper surface of support portion 52. Therefore, front left pillar portion 71 and rear left pillar portion 72 can more securely be fixed to the upper surface of support portions 51 and 52, respectively.

As shown in FIG. 12, front left pillar portion 71 is formed to have the cross-section in the U shape. As shown in FIG. 10, rear left pillar portion 72 is formed to have the cross-section in the U shape. By fixing front left pillar portion 71 having the cross-section in the U shape to the upper surface of support portion 51, front left pillar portion 71 is two-dimensionally fixed to the upper surface of support portion 51. By fixing rear left pillar portion 72 having the cross-section in the U shape to the upper surface of support portion 52, rear left pillar portion 72 is two-dimensionally fixed to the upper surface of support portion 52. Therefore, front left pillar portion 71 and rear left pillar portion 72 can more securely be fixed to the upper surface of support portions 51 and 52, respectively.

As shown in FIGS. 2 and 3, hydraulic excavator 1 includes right deck frame 40 located on the right of center frame 12. As shown in FIGS. 6, 8, and 9, hydraulic excavator 1 includes front right pillar portion 73 and rear right pillar portion 74. Front right pillar portion 73 and rear right pillar portion 74 support the exhaust gas treatment unit, as shown in FIGS. 6 and 7. Front right pillar portion 73 and rear right pillar portion 74 are fixed to right deck frame 40, as shown in FIG. 9. Of the plurality of pillar portions which support the exhaust gas treatment unit, by fixing front left pillar portion 71 and rear left pillar portion 72 to vertical plate 18 of center frame 12 and fixing front right pillar portion 73 and rear right pillar portion 74 to right deck frame 40, the exhaust gas treatment unit can be supported in a more stable manner.

As shown in FIGS. 2 and 3, center frame 12 has the plurality of engine mount portions 63-66 on which engine 9 is mounted. Mount member 59 is fixed to center frame 12. One resulting from partition of the upper surface of mount member 59 forms engine mount portion 66. The other resulting from partition of the upper surface of mount member 59 forms support portion 52. Since both the engine mount portion and the support portion are provided in one member and support portion 52 and engine mount portion 66 share the upper surface of one member, engine 9 mounted on engine mount portion 66 and the exhaust gas treatment unit supported by support portion 52 can accurately be positioned.

Support portion 51 which is one of the two support portions 51 and 52 fixed to vertical plate 18 is provided as a member which is different from engine mount portions 63-66. Support portion 52 which is the other of the two support portions 51 and 52 has constituted an integral construction with engine mount portion 66. Although the weight of the exhaust gas treatment unit is loaded on support portion 51, the weight of engine 9 is not loaded on support portion 51. The weight of both engine 9 and the exhaust gas treatment unit is loaded on support portion 52.

As shown in FIGS. 2 and 3, two support portions 51 and 52 fixed to center frame 12 are arranged at a distance from each other in the fore/aft direction of the vehicle. Since positioning of the exhaust gas treatment unit with center frame 12 is performed at two portions distant in the fore/aft direction of the vehicle, engine 9 and the exhaust gas treatment unit mounted on center frame 12 can accurately be positioned.

As shown in FIGS. 2 and 3, center frame 12 has vertical plate 16. Vertical plate 16 is arranged at a distance from vertical plate 18 in the lateral direction of the vehicle. Two support portions 51 and 52 fixed to center frame 12 are arranged outside a portion between the pair of vertical plates 16 and 18. Engine 9 with the large outside dimension is mounted on center frame 12. By arranging support portions 51 and 52 at the position outside the portion between vertical plates 16 and 18, support portions 51 and 52 do not interfere with the arrangement of engine 9. In addition, the exhaust gas treatment unit can be arranged without making it interfere with engine 9.

As shown in FIGS. 2 and 3, vertical plate 18 has left surface 18b opposed to vertical plate 16 and right surface 18a opposite to left surface 18b. Support portions 51 and 52 are fixed to right surface 18a of vertical plate 18. Thus, the arrangement of support portions 51 and 52 outside the portion between the pair of vertical plates 16 and 18 can readily be realized.

As shown in FIGS. 11 and 12, support portions 51 and 52 fixed to center frame 12 are located at the equal height position in the height direction. Line LN shown in FIGS. 11 and 12 extends in parallel with base plate 14. The upper surface of support portions 51 and 52 is aligned with line LN by machining the members fixed to center frame 12 along line LN to form support portions 51 and 52. Therefore, support portions 51 and 52 located at the equal height position in the height direction can readily be worked.

As shown in FIG. 10, the exhaust gas treatment unit has support member 80. The longitudinal direction of support member 80 corresponds to the lateral direction of the vehicle. Thus, the exhaust gas treatment unit having a width in the lateral direction of the vehicle can be supported in a stable manner.

As shown in FIG. 10, support portion 52 fixed to center frame 12 supports the central portion of support member 80 in the lateral direction of the vehicle. Thus, the center-of-gravity position of the exhaust gas treatment unit in the lateral direction of the vehicle is supported by support portion 52. Therefore, the exhaust gas treatment unit having the width in the lateral direction of the vehicle can be supported in a stable manner.

As shown in FIGS. 6 and 7, the exhaust gas treatment unit has two exhaust gas treatment devices 102,104 juxtaposed in the lateral direction of the vehicle. Thus, both of the two exhaust gas treatment devices 102,104 juxtaposed in the lateral direction of the vehicle can be supported in a stable manner.

Exhaust gas treatment device 102 is juxtaposed in right side, and exhaust gas treatment device 104 is juxtaposed in left side. Exhaust gas treatment device 102 of the upstream in the flow of the exhaust gas from engine 9 is arranged in the position which is distant from engine 9. With such arrangement, the length of exhaust pipe 111 (FIG. 13) which connects engine 9 and exhaust gas treatment device 102 can be lengthened more.

In the description of embodiment described above, two exhaust gas treatment devices 102,104 are supported by support portions 51 and 52 fixed to center frame 12. The configuration of the support portion of the present embodiment may apply to the support portion which supports either exhaust gas treatment device 102 or exhaust gas treatment device 104 independently. The exhaust gas treatment devices supported by the support portion may be an arbitrary exhaust gas treatment device, or may be a exhaust gas treatment unit which combines two or more arbitrary exhaust gas treatment devices.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 hydraulic excavator; 4 work implement; 9 engine; 9a projection portion; 10 revolving frame; 12 center frame; 16, 18 vertical plate; 16a, 18b left surface; 16b, 18a right surface; 40 right deck frame; 51, 52, 53, 54 support portion; 55, 56, 67 coupling portion; 59 mount member; 63, 64, 65, 66 engine mount portion; 69 fixation member; 71 front left pillar portion; 71a, 72a, 73a, 74a fixing plate portion; 72 rear left pillar portion; 73 front right pillar portion; 74 rear right pillar portion; 80, 85 support member; 90 bracket; 102,104 exhaust gas treatment device; and 111 Exhaust pipe.

The invention claimed is:

1. A hydraulic excavator, comprising:
a work implement;
an engine;
an exhaust gas treatment unit treating an exhaust gas from said engine;
a plurality of pillar portions supporting said exhaust gas treatment unit, the plurality of pillar portions extending in an upward/downward direction, each of the plurality of pillar portions including a fixing plate portion at a lower end;
at least two support portions each having an upper surface to which said fixing plate portion is fixed; and
a center frame having a vertical plate and carrying said engine, said vertical plate having a hole formed for a pin serving as a pivot axis of said work implement, said at least two support portions being fixed directly to said vertical plate.

2. The hydraulic excavator according to claim 1, wherein said at least two support portions are fixed to a side surface of said vertical plate.

3. The hydraulic excavator according to claim 1, wherein said pillar portion is formed to have a cross-section in a U shape.

4. The hydraulic excavator according to claim 1, comprising a deck frame located lateral to said center frame, to which at least one pillar portion of said plurality of pillar portions is fixed.

5. The hydraulic excavator according to claim 1, wherein said center frame has a plurality of engine mount portions on which said engine is mounted,
a mount member is fixed to said center frame, and
one resulting from partition of an upper surface of said mount member forms one of said plurality of engine mount portions and the other forms one of said at least two support portions.

6. The hydraulic excavator according to claim 1, wherein said at least two support portions are arranged at a distance from each other in a fore/aft direction of a vehicle.

7. The hydraulic excavator according to claim 1, wherein said center frame has a second vertical plate arranged at a distance from said vertical plate in a lateral direction of the vehicle, and
said at least two support portions are arranged outside a portion between said vertical plate and said second vertical plate.

8. The hydraulic excavator according to claim 7, wherein said vertical plate has a first surface opposed to said second vertical plate and a second surface opposite to said first surface, and
said at least two support portions are fixed to said second surface.

9. The hydraulic excavator according to claim 1, wherein said at least two support portions are located at an equal height position in a height direction.

10. The hydraulic excavator according to claim 1, wherein said exhaust gas treatment unit has a support member, and
a longitudinal direction of said support member corresponds to a lateral direction of a vehicle.

11. The hydraulic excavator according to claim 10, wherein
one of said at least two support portions supports a central portion of said support member in the lateral direction of the vehicle.

12. The hydraulic excavator according to claim 1, wherein said exhaust gas treatment unit has two exhaust gas treatment devices juxtaposed in a lateral direction of a vehicle.

* * * * *